United States Patent [19]
Ishida et al.

[11] Patent Number: 5,599,197
[45] Date of Patent: Feb. 4, 1997

[54] ELECTRICAL CONNECTOR FOR IC CARD

[75] Inventors: Mitsuo Ishida; Shoichi Tomioka, both of Tokyo, Japan

[73] Assignee: Hirose Electric Co., Ltd., Tokyo, Japan

[21] Appl. No.: 456,719

[22] Filed: Jun. 1, 1995

[51] Int. Cl.⁶ .................................................. H01R 13/62
[52] U.S. Cl. ............................................................. 439/159
[58] Field of Search ..................................... 439/153, 155, 439/157, 159, 160

[56] References Cited

U.S. PATENT DOCUMENTS

| | | | |
|---|---|---|---|
| 5,139,453 | 8/1992 | Komatsu et al. | 439/159 |
| 5,368,493 | 11/1994 | O'Brien et al. | 439/153 |
| 5,451,168 | 9/1995 | Shucy | 439/159 |
| 5,456,610 | 10/1995 | Banakis et al. | 439/153 |
| 5,492,480 | 2/1996 | Fusselman et al. | 439/157 |
| 5,503,564 | 4/1996 | Fatatsugi et al. | 439/153 |
| 5,507,658 | 4/1996 | Ho | 439/159 |

FOREIGN PATENT DOCUMENTS 613072  2/1994  Japan.

*Primary Examiner*—P. Austin Bradley
*Assistant Examiner*—Jill DeMello
*Attorney, Agent, or Firm*—Kanesaka & Takeuchi

[57] ABSTRACT

The IC card electrical connector includes an ejector button (10), a spring member (11) for biasing the ejector button forwardly, an engaging member (12) pivoted to the ejector button and engaging with the housing to hold the ejector button in place, and a cam mechanism. The cam mechanism includes a cam section (9) having a first cam face (9A) and a second cam face (9B) and an intermediate member (6) having a cam follower (6B). When the engaging member is released to allow forward movement of the ejector button, the intermediate member is biased into a space between the ejector button and the eject bar. The cam follower is provided on a resilient arm (6A) so that it moves on the first cam face whereas when an IC card is inserted to move the eject bar forwardly, it slides on the second cam face to escape from the space.

1 Claim, 6 Drawing Sheets

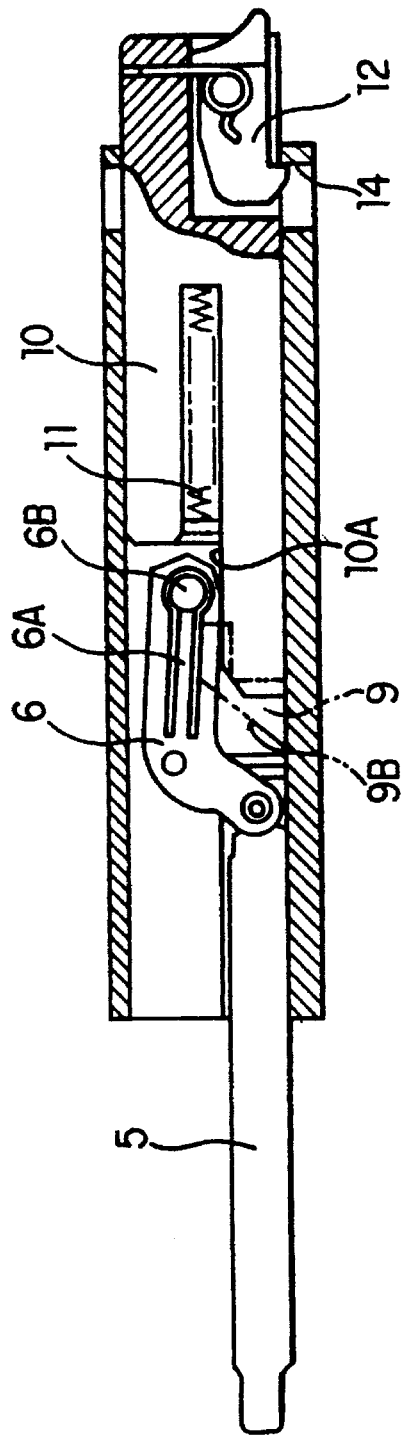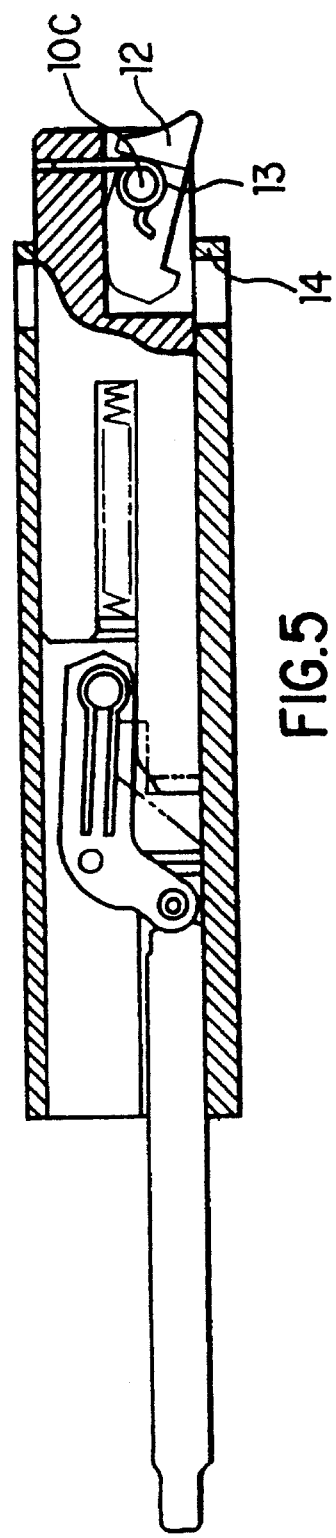

ELECTRICAL CONNECTOR FOR IC CARD

BACKGROUND OF THE INVENTION

1. Field of the Invention

The present invention relates to electrical connectors for IC cards.

2. Description of the Prior Art

Japanese UM Patent Application Kokai No. 4-133369 discloses an electrical connector of this type. As shown in FIG. 9, the connector includes a housing having a cavity 53 into which an IC card 82 is inserted at a position shown by a phantom line. A movable plate 54 is provided in the cavity 53 for receiving a front portion of the IC card 52 and movable along sides of the housing. A front edge of the movable plate 54 is bent to form an abutment section 55 for abutment with the front end of the IC card 52. A slot 56 is provided on the movable plate 54 for receiving a stud 57 of the housing, to which an eject lever 58 is pivoted for rotation about the stud 57. The eject lever 58 has a slot 59 with which a projection 60 of the movable plate 54 engages. The other end of the eject lever 58 projects into a side wall of the cavity 53, where it engages with a groove 61A of an eject bar 61. The eject bar 61 is connected to a push button 62 adjacent to a mouth of the cavity 53. The push button 62 is positioned adjacent to the rear end of the IC card 52 inserted in the cavity 53.

The ejector button 62 is at a forward position shown by a solid line when the IC card is used. To remove the IC card, the ejector button 62 is depressed by a distance shown by an arrow A to a rearward position shown by a phantom line to thereby move the movable plate 54 forwardly through the eject lever 58 so that the IC card 52 is pushed forwardly by the abutment section 55 of the movable plate 54 for removal.

When the IC card 52 is stored in the cavity the ejector button 62 is substantially flush with the rear end of the IC card 52. Thus, it is very difficult to depress the ejector button 62 to remove the IC card 52. It is frequent to accidentally depress both the ejector button 62 and the IC card.

If the ejector button 62 is made to project forwardly to avoid such a problem, it can be depressed unintentionally during the use of the IC card, thereby causing the IC card to spring out of the cavity.

SUMMARY OF THE INVENTION

Accordingly, it is an object of the invention to provide an IC card electrical connector which is able to minimize such a problem with a simple structure.

According to the invention there is provided an IC card electrical connector which includes a housing having a cavity for receiving an IC card, a movable plate provided in the cavity and having an abutment portion for abutment with a front end of the IC card in the cavity, an eject lever pivoted to the housing for rotation in a plane parallel to a major plane of the IC card, one end of the eject lever engaging the movable plate and another end of the eject lever projecting into an opening within a side wall of the housing, an eject bar engaging with the another end of the eject lever and movable in a lengthwise direction of the IC card, and an ejector button for exerting a force on the eject bar, characterized by a spring member provided between the housing and the ejector button to bias the ejector button forwardly; an engaging member provided on the ejector button for engaging the housing to hold the ejector button in place; a cam mechanism provided between the ejector button and the eject bar and having a cam section with a first cam face and a second cam face and an intermediate member with a cam follower to cooperate with the cam section such that when the engaging means is released to allow forward movement of the ejector button, the intermediate member is biased by a spring member into a space between the ejector button and the eject bar; the cam follower deflected by the first cam face when the ejector button is depressed to move the intermediate member rearwardly whereas the cam follower slides on the second cam face to move out of the space against the spring member when the IC card is inserted to move the eject bar forwardly.

How to plug an IC card into or out of the connector according to the invention will be described below.

(1) An IC card is inserted into the cavity so that the movable plate turns the eject lever to move the eject bar forwardly.

(2) The eject bar moves the intermediate member forwardly so that the cam follower slides on the second cam face to escape from the space between the ejector bar and the ejector button. The ejector button is prevented by the engaging member from moving forwardly to the forwardly protruded position. Now, the IC card is ready to use.

(3) To remove the IC card, the engaging member is released so that the ejector button is protruded forwardly by the spring member. Consequently, the intermediate member is biased into the space between the ejector button and the eject bar to connect the ejector button and the eject bar.

(4) Then, the ejector button is depressed so that the eject bar is moved rearwardly through the intermediate member. The eject lever then is turned to moves the movable plate forwardly so that the IC card is now removable. The depressed ejector button is kept by the engaging member at the same position as the above paragraph (2).

BRIEF DESCRIPTION OF THE DRAWINGS

FIGS. 4–8 are longitudinal sections of an ejector according to an embodiment of the invention showing how to plug an IC card into and out of the electrical connector.

DESCRIPTION OF THE PREFERRED EMBODIMENT

An embodiment of the invention will be described below with reference to the accompanying drawings.

Figure 1:
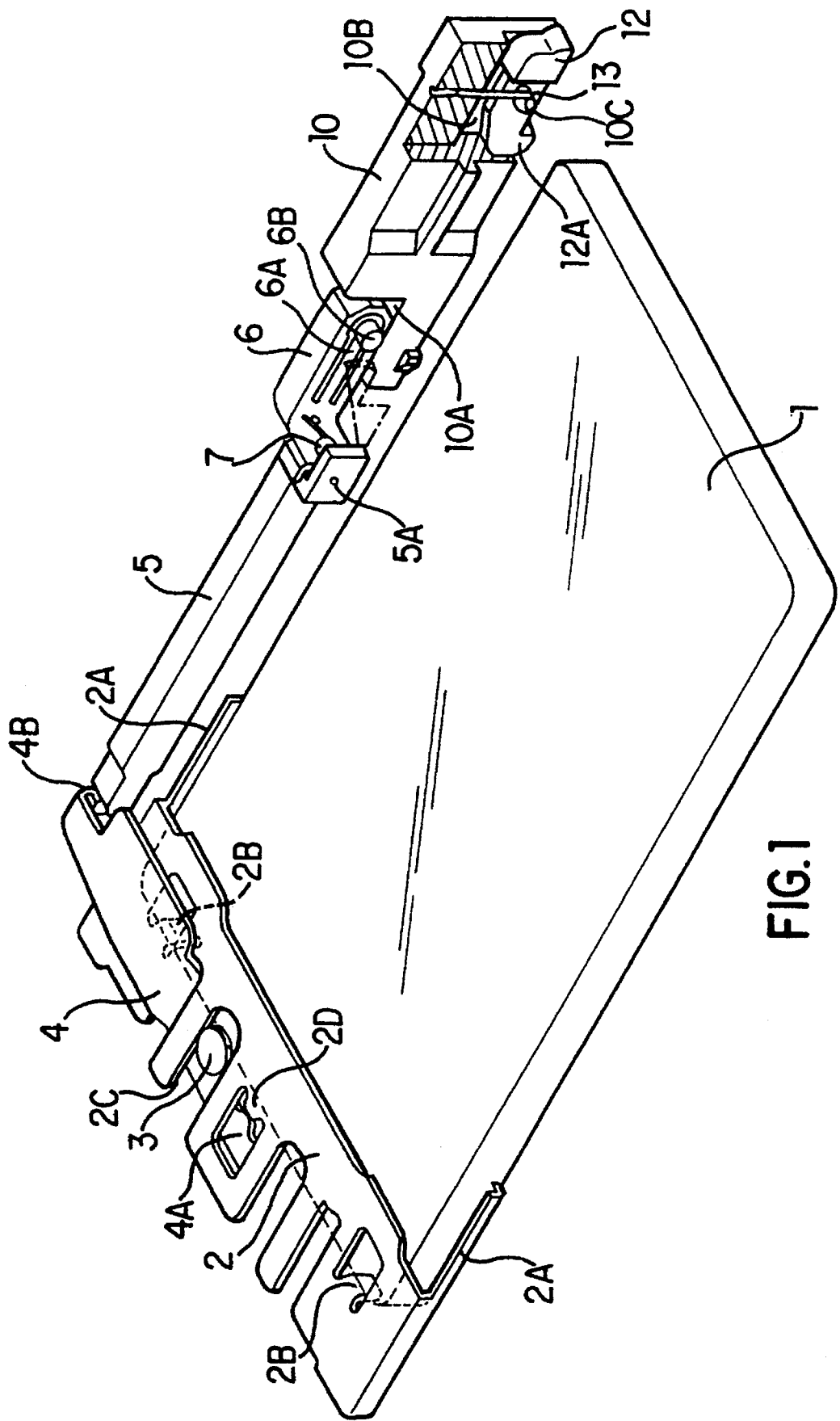
FIG. 1 is a perspective view of essential part of an electrical connector for IC cards according to an embodiment of the invention.

FIG. 1 shows an IC card in the cavity of a housing and a receiving/ejecting mechanism for receiving and ejecting the IC card.

In FIG. 1, an IC card 1 is inserted in the cavity of a housing. A front portion of the IC card 1 is received by a movable plate 2. The movable plate 2 is made movable in the cavity along sides of the housing. A pair of guide sections 2A is provided on opposite sides of the movable plate. Abutment tabs 2B are formed on the movable plate 2 for abutment with the front end of the IC card. A recess 2C extends forwardly from the rear edge of the movable plate 2 for receiving a stud 3 of the housing.

An eject lever 4 is pivoted to the stud 3 for rotation. The eject lever 4 has at an end a semi-circular work point 4A for abutment with a load point 2D of the movable plate 2. The eject lever 4 has at the other end an effort point 4B for receiving forces from an eject bar 5.

The eject bar 5 abuts the effort point 4B at a rear end and supports at a front end an intermediate member 6 for rotation about a shaft 5A.

The intermediate member 6 has a J shaped configuration. A spring member 7 is wound around the shaft 5A between the intermediate member 6 and the eject bar 5 to bias the intermediate member 6 in a clockwise direction. The intermediate member 6 has a U shaped groove to form a cantilevered resilient arm 6A which is deflectable in the widthwise direction of the IC card. The resilient arm 6A has a cylindrical cam follower 6B at the front end.

Figure 2:
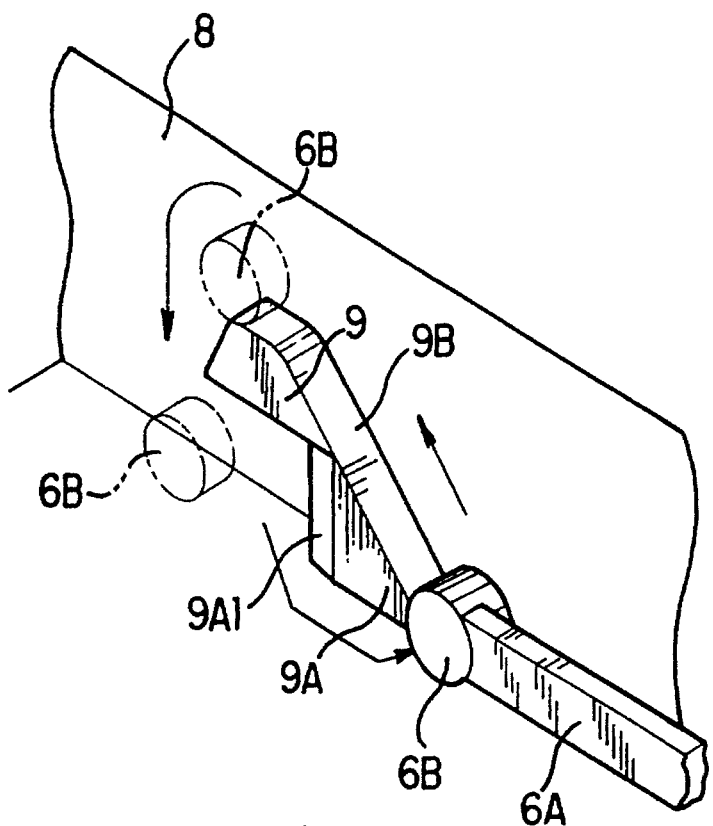
FIG. 2 is a perspective view of a cam section for the electrical connector.
Figure 3:
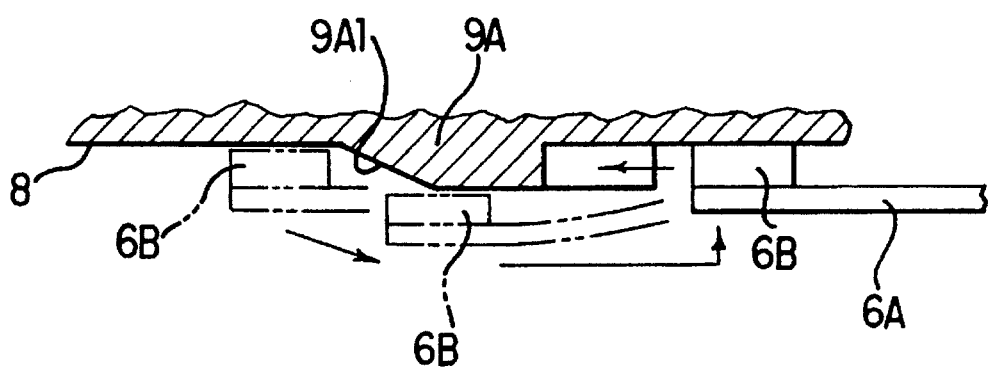
FIG. 3 is a sectional view of the cam section.

As shown in FIGS. 2 and 3, a cam section 9 is provided on an inner wall 8 of the housing corresponding to the cam follower 6B. The cam section 9 has a first cam face 9A and a second cam face 9B. The first cam face 9A has a tapered section 9A1 so that the cam follower 6A climbs on the cam face 9A when the intermediate member 6 moves rearwardly along the inner wall 8. The second cam face 9B is sloped so that the cam follower 6B is raised as it moves forwardly.

The front portion of the intermediate member 6 rests on the stepped section 10A of the ejector button 10. Since the intermediate member 6 is biased by the spring member 7, the front portion is normally pressed against the stepped section 10A. As shown in FIG. 4, a spring member 11 is provided between the ejector button 10 and the housing so that the ejector button 10 is biased forwardly. The ejector button 10 has a recess 10B on the lower front corner, where an engaging member 12 is housed. The engaging member 12 is rotatable about a shaft 10C. The engaging member 12 has at a rear end an engaging claw 12A for engaging with an engaging aperture 14 of the housing and a front end projecting from a recess 10B of the ejector button 10. A spring member 13 is wound around the shaft 10C to bias the engaging member 12 in a counterclockwise direction so that the engaging claw 12A engages with the engaging aperture 14. This engagement prevents the ejector button 10 from moving forwardly.

How to plug an IC card into or out of the connector will be described below with reference to FIGS. 4–8.

(1) In FIG. 4, an IC card (not shown) is in the cavity of the housing for use. The IC card pushes the movable plate 2 (not shown) to the rear position which moves the eject bar 5 to the front position through the eject lever 4. The cam follower 6B of the intermediate member 6 moves over the second cam face 9B of the cam section 9 so that the front end rests on the stepped section 10A of the ejector button 10. The ejector button 10 is prevented from moving forwardly by the engaging member 12 so that the ejector button 10 is and the eject bar 5 are close to each other.

(2) To remove the IC card, the engaging member 12 is turned clockwise about the shaft 10C against the spring member 13 to release the engagement with the engaging aperture 14 of the housing as shown in FIG. 5.

Figure 6:
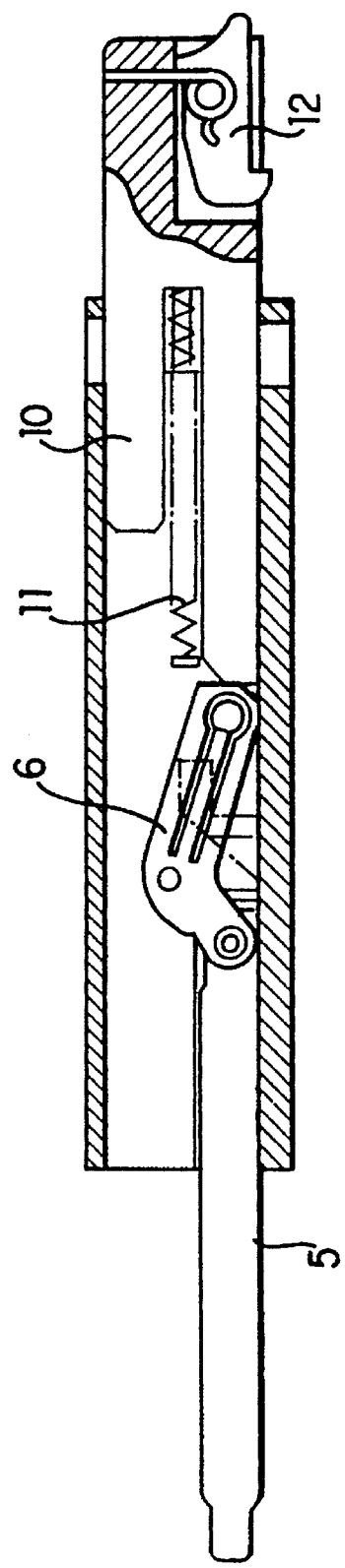

(3) Since the ejector button 10 is biased forwardly by the spring member 11, it projects from the front end of the housing as shown in FIG. 6. When the ejector button 10 is moved forwardly, the intermediate member 6 is turned clockwise by the spring member 7 so that the eject bar 5 is connected to the ejector button 10 through the intermediate member 6.

Figure 7:
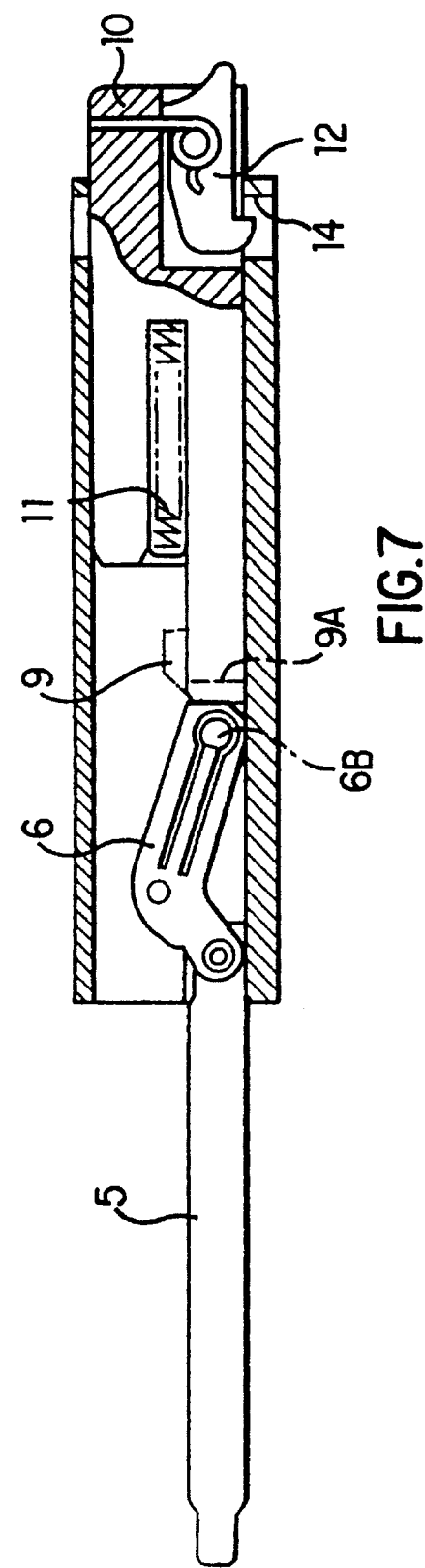
Figure 8:
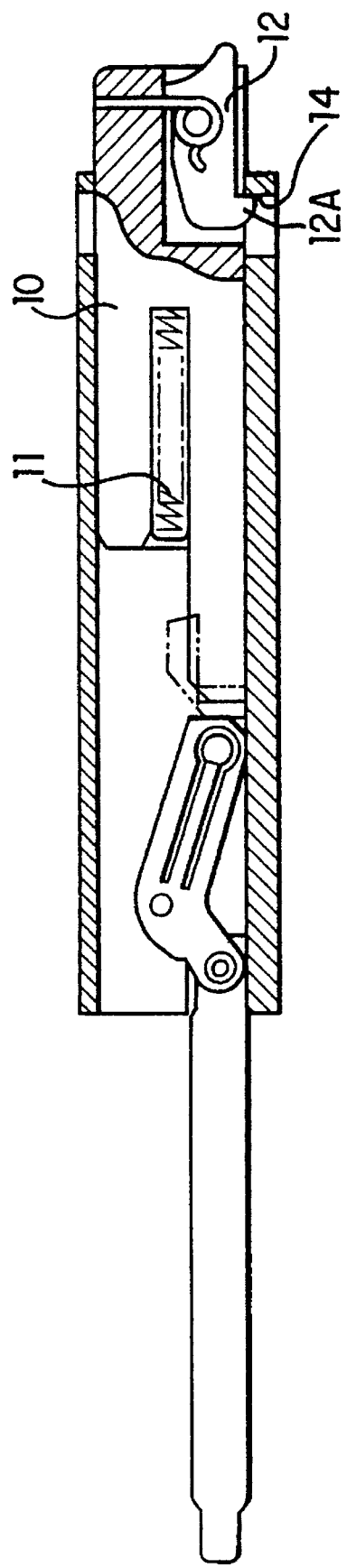
Figure 9:
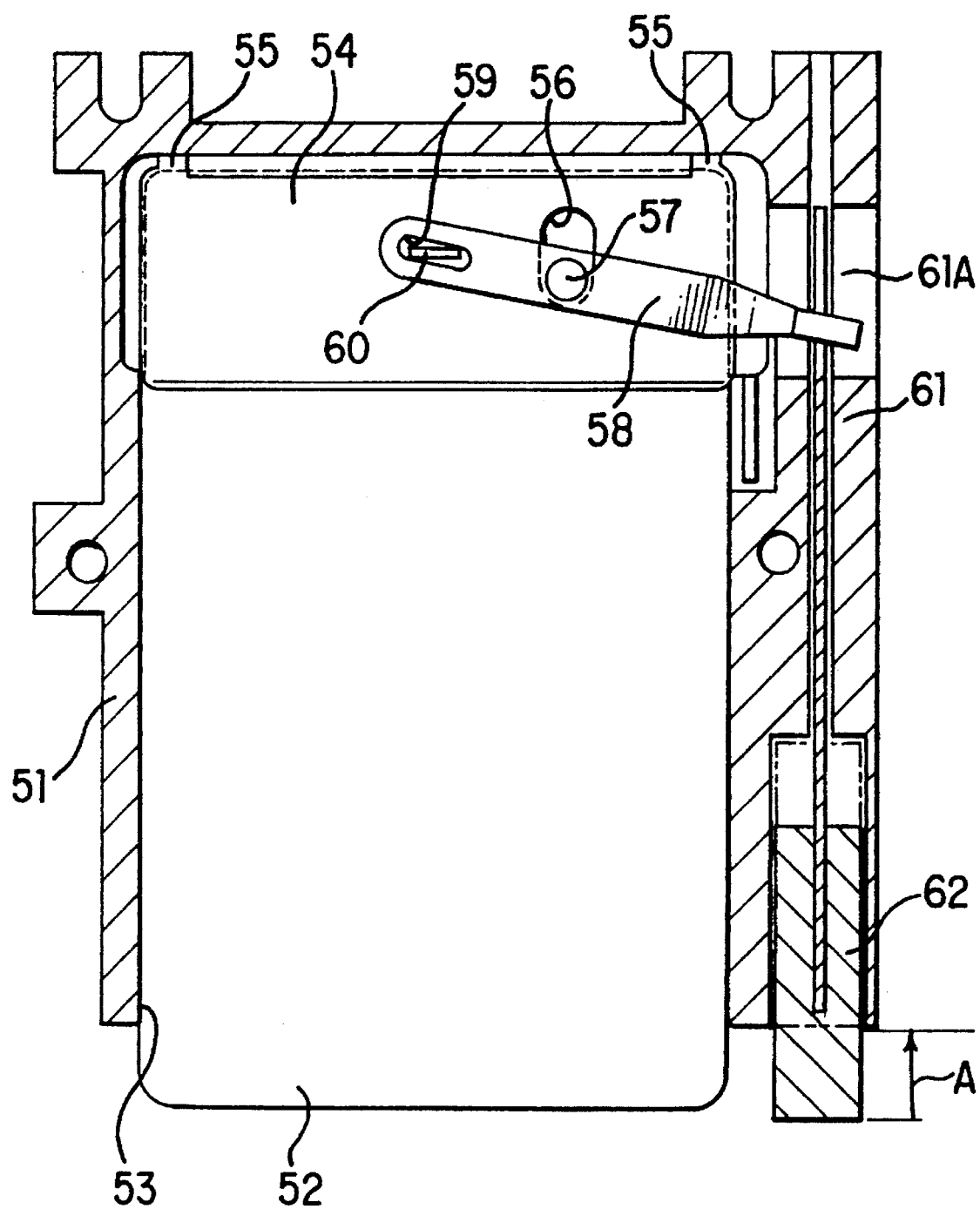
FIG. 9 is a sectional view of a conventional card connector.

(4) Then, the ejector button 10 is depressed against the spring member 11. As shown in FIG. 7, the engaging member 12 is turned counterclockwise by the spring member 13 into the engaging aperture 14, while the eject bar 5 is moved rearwardly through the intermediate member 6. As shown in FIGS. 2 and 3, the cam follower 6B is moved to the rear position of the cam section 9 over the first cam face 9A. Thus, the eject bar 5 turns the eject lever 4 counterclockwise to move the movable plate 2 to the front position, where the IC card is removable. When the pressure on the ejector button 10 is released, the ejector button 10 is moved forwardly a little to the engaging position where the engaging claw 12A of the engaging member 12 engages the engaging aperture 14 as shown in FIG. 8.

(5) When the IC card is inserted again, the movable plate 2 turns the eject lever 4 clockwise to move forwardly the eject bar 5. The cam follower 6B of the intermediate member 6 is then raised along the second cam face 9B of the cam section 9 (FIGS. 2 and 3) to turn the intermediate member 6 counterclockwise against the spring member 7. The cam follower 6B then rests on the stepped section 10A of the ejector button 10 to allow advancement of the eject bar 5 as shown in FIG. 4. The ejector button 10 is kept at the rearward position by the engaging member 12. The operation is repeated thereafter as described above.

According to the invention, the ejector button is protruded temporarily at the time of removal of the IC card and normally is not protruded from the housing so that inadvertent depression of the ejector button is minimized. In addition, the protruded ejector button facilitates depressing operation of the ejector button. Moreover, the structure of the ejector is made simple.

What is claimed is:

1. An IC card electrical connector comprising:

a housing having a cavity for receiving an IC card, a movable plate provided in said cavity and having an abutment portion for abutment with a front end of said IC card in said cavity, an eject lever pivotally attached to said housing for rotation in a plane parallel to a major plane of said IC card, one end of said eject lever engaging said movable plate and another end of said eject lever projecting into an opening within a side wall of said housing, an eject bar engaging said another end of said eject lever and movable is a lengthwise direction of said IC card, an ejector button for exerting a force on said eject bar, a spring member provided between said housing and said ejector button to bias said ejector button in a first direction;

an engaging member provided on said ejector button for engaging said housing to hold said ejector button in place;

cam means provided between said ejector button and said eject bar and having a cam section with a first cam face and a second cam face and an intermediate member with a cam follower to cooperate with said cam section such that when said engaging member is released to allow movement of said ejector button in said first direction, said intermediate member is biased to fit into a space between said ejector button and said eject bar;

said cam follower deflected to pass said first cam face when said ejector button is depressed to move said intermediate member in a second direction opposite to said first direction while said cam follower engages said second cam face to move out of said space when said IC card is inserted to move said eject bar in said first direction.

* * * * *